(12) United States Patent
Krüger

(10) Patent No.: US 8,561,314 B2
(45) Date of Patent: Oct. 22, 2013

(54) INSTALLATION FOR DRYING ORGANIC MATTER

(75) Inventor: Günter Krüger, Dornheim (DE)

(73) Assignee: Inotec GmbH Co. Holding und Handels-KG, Reutlingen (DE)

( * ) Notice: Subject to any disclaimer, the term of this patent is extended or adjusted under 35 U.S.C. 154(b) by 833 days.

(21) Appl. No.: 12/524,291

(22) PCT Filed: Jan. 21, 2008

(86) PCT No.: PCT/EP2008/000411
§ 371 (c)(1),
(2), (4) Date: Feb. 9, 2010

(87) PCT Pub. No.: WO2008/089931
PCT Pub. Date: Jul. 31, 2008

(65) Prior Publication Data
US 2010/0132210 A1    Jun. 3, 2010

(30) Foreign Application Priority Data

Jan. 25, 2007 (DE) .................... 20 2007 001 123 U

(51) Int. Cl.
*F26B 3/347* (2006.01)
*F26B 13/30* (2006.01)
*F26B 21/06* (2006.01)
*F26B 19/00* (2006.01)

(52) U.S. Cl.
USPC ........... 34/92; 34/259; 34/73; 34/185; 34/186

(58) Field of Classification Search
USPC ........ 34/259, 60, 73, 92, 263, 266, 265, 267, 34/291, 295, 386, 391, 402, 403, 406, 498, 34/499, 558, 559, 593, 63, 166, 185, 186, 34/201
See application file for complete search history.

(56) References Cited

U.S. PATENT DOCUMENTS

| | | | | |
|---|---|---|---|---|
| 1,825,261 A | * | 9/1931 | Burns et al. | 366/309 |
| 2,858,795 A | * | 11/1958 | Walker | 118/50 |
| 3,142,546 A | * | 7/1964 | Coats | 34/137 |
| 3,194,504 A | * | 7/1965 | Entrikin | 241/98 |

(Continued)

FOREIGN PATENT DOCUMENTS

| | | |
|---|---|---|
| DE | 1607783 | 1/1971 |
| DE | 19507181 | 9/1996 |

(Continued)

*Primary Examiner* — Jiping Lu
(74) *Attorney, Agent, or Firm* — Bachman & LaPointe, P.C.

(57) ABSTRACT

An installation for drying organic matter, especially kitchen and food wastes or other biological matter, including matter that contains packaging residues, napkins, straws or the like. The installation comprises the following components: (a) a vacuum mixer (M) having a closable charging opening for introducing the organic matter and a closable discharge opening, disposed at the bottom or laterally towards the bottom, for the dried matter, (b) at least one vacuum pump (VP) for evacuating the air in the mixer to generate the vacuum, the pump being connected to at least one evacuation tube mounted above the maximum filling level in the housing of the mixer (M), (c) a heater (H) for heating the organic matter, (d) at least one condenser (K), connected to the air evacuation duct (AL) of the vacuum pump (VP) and having a cooling unit (KA) connected thereto to condense the evacuated air, and (e) a discharge duct (AW) for the condensate obtained from the evacuated air by cooling in the condenser (K).

16 Claims, 2 Drawing Sheets

(56) References Cited

U.S. PATENT DOCUMENTS

| | | | | |
|---|---|---|---|---|
| 3,497,452 A | * | 2/1970 | Arvanitakis | 210/663 |
| 3,574,951 A | * | 4/1971 | Oetjen et al. | 34/92 |
| 3,672,958 A | * | 6/1972 | McCandlish | 202/170 |
| 3,759,879 A | * | 9/1973 | Floros | 526/65 |
| 3,777,095 A | * | 12/1973 | Muranaka | 219/751 |
| 3,997,406 A | * | 12/1976 | Arvanitakis | 202/175 |
| 4,040,768 A | * | 8/1977 | Christian | 416/122 |
| 4,140,478 A | * | 2/1979 | Kawakami et al. | 432/13 |
| 4,177,575 A | * | 12/1979 | Brooks | 34/392 |
| 4,330,946 A | * | 5/1982 | Courneya | 34/263 |
| 4,389,794 A | * | 6/1983 | Bitterly | 34/287 |
| 4,410,433 A | * | 10/1983 | Arvanitakis | 210/778 |
| 4,615,801 A | * | 10/1986 | Lee | 210/185 |
| 4,698,917 A | * | 10/1987 | Debolini | 34/92 |
| 4,711,041 A | * | 12/1987 | Ullum | 34/179 |
| 4,712,312 A | * | 12/1987 | Christodoulou | 34/593 |
| 4,733,607 A | * | 3/1988 | Star et al. | 99/348 |
| 4,856,203 A | * | 8/1989 | Wennerstrum | 34/68 |
| 4,876,802 A | * | 10/1989 | Gergely et al. | 34/408 |
| 4,882,851 A | * | 11/1989 | Wennerstrum et al. | 34/60 |
| 4,954,681 A | * | 9/1990 | Ishikawa et al. | 219/697 |
| 5,047,123 A | * | 9/1991 | Arvanitakis | 202/170 |
| 5,078,836 A | * | 1/1992 | Hogan | 201/7 |
| 5,083,506 A | * | 1/1992 | Horn et al. | 99/348 |
| 5,117,771 A | * | 6/1992 | Summers | 110/346 |
| 5,121,699 A | * | 6/1992 | Frank | 110/246 |
| 5,142,998 A | * | 9/1992 | Feitel | 110/215 |
| 5,143,626 A | * | 9/1992 | Nugent | 210/748.08 |
| 5,228,987 A | * | 7/1993 | Arvanitakis | 210/182 |
| 5,229,010 A | * | 7/1993 | Fluchel | 210/748.07 |
| 5,285,581 A | * | 2/1994 | Walker | 34/500 |
| 5,299,865 A | * | 4/1994 | Presnell | 366/300 |
| 5,382,092 A | * | 1/1995 | Okamoto et al. | 366/320 |
| 5,433,020 A | * | 7/1995 | Leech, Jr. | 34/403 |
| 5,609,735 A | * | 3/1997 | Hetzel et al. | 203/52 |
| 5,681,481 A | * | 10/1997 | Christy et al. | 210/723 |
| 5,683,178 A | * | 11/1997 | Nakamoto et al. | 366/325.3 |
| 5,724,751 A | * | 3/1998 | Ellingsen | 34/354 |
| 5,741,066 A | * | 4/1998 | Presnell | 366/320 |
| 5,839,674 A | * | 11/1998 | Ellis | 241/73 |
| 5,851,361 A | * | 12/1998 | Hogan | 202/136 |
| 5,851,404 A | * | 12/1998 | Christy et al. | 210/723 |
| 5,857,264 A | * | 1/1999 | Debolini | 34/179 |
| 5,869,810 A | * | 2/1999 | Reynolds et al. | 219/388 |
| 5,869,817 A | * | 2/1999 | Zietlow et al. | 219/696 |
| 5,886,326 A | * | 3/1999 | Tang | 219/679 |
| 5,924,861 A | * | 7/1999 | Rinker et al. | 432/139 |
| 5,987,770 A | * | 11/1999 | Hino | 34/92 |
| 6,012,447 A | * | 1/2000 | Waxler et al. | 126/343.5 R |
| 6,079,118 A | * | 6/2000 | Kiyokawa | 34/134 |
| 6,092,301 A | * | 7/2000 | Komanowsky | 34/263 |
| 6,125,550 A | * | 10/2000 | Kendall et al. | 34/316 |
| 6,139,793 A | * | 10/2000 | Vanderwal | 422/1 |
| 6,143,221 A | * | 11/2000 | Gurol | 264/118 |
| 6,163,976 A | * | 12/2000 | Tada et al. | 34/72 |
| 6,258,215 B1 | * | 7/2001 | Samsonov et al. | 202/176 |
| 6,270,708 B1 | * | 8/2001 | Gurol | 264/117 |
| 6,299,774 B1 | * | 10/2001 | Ainsworth et al. | 210/603 |
| 6,380,517 B2 | * | 4/2002 | Morgan | 219/389 |
| 6,470,593 B1 | * | 10/2002 | Seo | 34/92 |
| 6,564,948 B2 | * | 5/2003 | Izumi | 210/396 |
| 6,578,468 B1 | * | 6/2003 | Horn | 99/334 |
| 6,752,956 B1 | * | 6/2004 | Vanderwal | 422/3 |
| 6,754,978 B1 | * | 6/2004 | Adams et al. | 34/361 |
| 7,001,629 B1 | * | 2/2006 | Mengal et al. | 426/241 |
| 7,131,765 B2 | * | 11/2006 | Backhaus | 366/149 |
| 7,132,531 B1 | * | 11/2006 | Wellings et al. | 536/25.3 |
| 7,140,122 B1 | * | 11/2006 | Adams et al. | 34/361 |
| 7,464,485 B2 | * | 12/2008 | Kawase | 34/60 |
| 7,585,105 B2 | * | 9/2009 | Reinecke | 366/309 |
| 7,629,497 B2 | * | 12/2009 | Pringle | 585/241 |
| 7,665,226 B2 | * | 2/2010 | Tsuruta et al. | 34/259 |
| 7,669,349 B1 | * | 3/2010 | Palmer et al. | 34/381 |
| 7,871,193 B2 | * | 1/2011 | Brod et al. | 366/97 |
| 7,966,744 B2 | * | 6/2011 | Kim et al. | 34/259 |
| 8,015,841 B2 | * | 9/2011 | Cheng | 62/616 |
| 8,020,313 B2 | * | 9/2011 | Palmer et al. | 34/60 |
| 8,020,314 B2 | * | 9/2011 | George et al. | 34/259 |
| 8,043,505 B2 | * | 10/2011 | Noguchi et al. | 210/257.2 |
| 8,065,815 B2 | * | 11/2011 | Christy et al. | 34/381 |
| 8,123,194 B2 | * | 2/2012 | Nozawa | 251/161 |
| 8,142,178 B2 | * | 3/2012 | Van Damme | 425/203 |
| 2002/0195031 A1 | * | 12/2002 | Walker | 110/229 |
| 2005/0000108 A1 | * | 1/2005 | Ragnarsson | 34/92 |
| 2008/0083675 A1 | * | 4/2008 | Christy et al. | 210/766 |
| 2009/0113751 A1 | * | 5/2009 | Teng et al. | 34/266 |
| 2010/0000110 A1 | * | 1/2010 | Li | 34/259 |
| 2010/0050466 A1 | * | 3/2010 | Titmas | 34/499 |
| 2010/0132215 A1 | * | 6/2010 | Denk | 34/389 |
| 2010/0218395 A1 | * | 9/2010 | Durance et al. | 34/265 |
| 2012/0030963 A1 | * | 2/2012 | Durance et al. | 34/284 |

FOREIGN PATENT DOCUMENTS

| | | | |
|---|---|---|---|
| DE | 19507181 A1 | * | 9/1996 |
| EP | 0549861 | | 7/1993 |
| EP | 884544 A1 | * | 12/1998 |
| WO | 0052405 | | 9/2000 |

* cited by examiner

INSTALLATION FOR DRYING ORGANIC MATTER

BACKGROUND OF THE INVENTION

The invention relates to an installation for drying organic matter, in particular kitchen and food wastes or other biological matter, including those which contain packaging residues, napkins, straws or the like, having the following components:

a) a vacuum mixer having at least one mixing blade in a housing and having a closable filling opening 42 for introducing the organic matter and a closable emptying opening on the underside or laterally toward the underside for the dried matter, b) at least one vacuum pump, connected to at least one extraction connector 40 fitted in the housing of the mixer above the maximum filling height, in order to extract the air in the mixer to produce the vacuum, c) a heating device for heating the organic matter, d) at least one condenser, connected to the waste air line of the vacuum pump, and having a cooling unit connected thereto for condensing the extracted air, and e) a drain line for the condensate obtained from the waste air by cooling in the condenser.

In order to dry biological matter, for example clarified sludges accumulating during wastewater clarification, liquid manure and other microbiological and regenerative biological matter, in particular following fermentation, it is known to dry it in ovens following pressing and to burn the solid residual components in CHP units. It is further known, from DE 28 33 731 A1, to mix biological matter from the group comprising solid municipal waste, agricultural wastes, foodstuffs wastes, paper wastes, disintegrated wood, wood wastes or other cellulose-rich materials with binders from the group comprising water, clarified sludge, waste liquors, tar oil condensate, molasses residues or other starch-containing waste materials with one another and to compress it into briquettes.

DE 692 22 135 T2 discloses a process for the production of fuel by drying a sludge dewatered to a dry mass content of at least 15% to 30%. The dewatered sludge, before drying, is mixed with a combustible material which has a lower water content than the sludge, to form a composite product. By using a drying installation for heating, the mixture is dried to a desired, combustible dry matter. The drying installation is a drum installation having a heating device at one end. The composite product is supplied directly to the heating device and, for the most part, is shaped mechanically and pneumatically to form a fuel. The fuel can be handled, for example, in the form of pellets.

A vacuum mixer for dental applications and the like is known from DE-B 1 607 783 in order to mix casting and/or kneading compounds with one another. Furthermore, devices for mixing and kneading organic or inorganic compounds or dough are known in an extremely wide range of designs. According to U.S. Pat. No. 3,194,504, these can have outer mixing blades and inner mixer disks. U.S. Pat. No. 1,825,261 discloses a coffee bean mixing machine in which helical mixing blades are provided right through a closed cylindrical housing in order to mix the coffee beans with one another.

The known installations for drying organic matter are large installations. They are not suitable for processing kitchen wastes, food wastes and other wastes accumulating in the gastronomic and canteen sector and in the use of foodstuffs hygienically in such a way that these can be burned or supplied to waste utilization as a dry product, without the liberation of smells. Until now, the wastes have been collected over days or weeks in containers as foul smelling matter and then disposed of via the domestic waste or following complicated sterilization.

DE 195 07 181 A1 discloses an apparatus for mixing or kneading organic or inorganic matter or dough, having an elongated housing with a substantially horizontal longitudinal axis. Outer and inner mixing blades are mounted around this longitudinal axis and can be driven. In this case, the mixing blades are constructed and driven in such a way that the outer mixing blade conveys the material to be mixed in one longitudinal direction and the inner mixing blade conveys the material to be mixed in the opposite direction or vise versa, or else conveyance in the same direction is carried out.

WO 00/52405 A discloses an installation for the hygienic treatment and drying of organic waste. This waste is treated by means of stirring elements in a vertical reactor, being heated in the vertical reactor by microwave energy introduced from outside. Furthermore, this reactor can be evacuated.

The invention is based on the object of specifying an installation to permit organic matter, in particular biological matter such as kitchen and food wastes, contaminated or not contaminated with napkins, drinking straws, packaging residues, to be treated virtually without smell to form dry matter which can be supplied to domestic waste or combustion in a heating installation or to other uses or disposed of without hesitation.

SUMMARY OF THE INVENTION

The invention achieves the object by configuring an installation wherein the installation can be implemented as a compact unit, specifically in various sizes. For instance, the mixer can be a 20, 50, 100, 150, 200, 500 or 1000 liter mixer and larger, which can be mounted on a platform together with further components or assembled to form a structural unit. Such a compact installation can, for example, be installed in the waste chambers of a restaurant or a canteen. However, even larger mixers or mixers with other volumes can be used. The design and dimensioning depend on the respective use. Instead of a cooling unit which is driven electrically, for example, relatively cool tap water or other cool service water can be used in the condenser for the condensation process of the vapor-like air mixture extracted from the mixer by the vacuum pump. The mode of action is enhanced, however, if an electrically driven cooling unit is used, in order to arrange for cooled cooling liquid to flow around the condensation pipe in the condenser. In the installation, any known vacuum pump can be used to extract the waste air from the organic matter, including any possible foul gas. This moisture-containing air and water vapor is then condensed in the condenser and the condensate is led into the sewerage system as wastewater.

In order to accelerate the drying process and the evaporation process, provision is made for the bottom and/or side and end walls of the housing of the mixer and/or at least one mixing blade in the mixer to heat the organic matter introduced, via suitable heating devices. For this purpose, electric heating elements can be provided, which are inserted into appropriate channels in the components. However, heating by means of a hot water line, for example by hot water fed from a heating line present in the building, also possible. In this case, it is necessary for water-carrying channels to be provided in the components in a known way or for the latter to be hollow and for feed lines and distributors and drain lines with manifolds to be provided, in order to close the heating water circuit. This is also possible when mixer blades are used, since the latter are hollow or have line ducts, feeding being carried out via a hollow shaft, as is discharge. Expediently, the mixer blade is then mounted on the end walls of the mixer on both sides via distributors.

Instead of or as well as the heating device described, a microwave heating device can also be used. It has been shown that if a microwave generator is introduced, for example into the hood, and if microwaves in the region of 2.5 GHz are generated, efficient internal heating of the material to be mixed in the mixer can likewise be achieved, even if the mixing blades consist of metal. Trials by means of infrared light heating devices have further shown that rapid intensive heating of the material to be mixed can also be achieved by this method. The best efficiency has been achieved with infrared light in the wavelength range from 2 to 6 µm. The power of the microwave generator or that of the infrared heat source should be matched appropriately to the size of the mixer. As a result of the closed design of the mixer with the metal hood, when radiant heat sources are used, safe shielding with respect to the outside is simultaneously provided.

Trials have shown that, in the installation, mixers which are described in the patent specifications DE 195 07 181 C2 and DE 43 41 569 C2 have proven to be particularly efficient. The teachings also apply to the mixers for the installation according to the invention. These mixers ensure optimal evaporation of the moisture components of the organic matter even in the event of slow rotation of the mixing blades. In large installations, the mixing blades can also be heated directly, as already described previously. With these mixers, it is also possible to interrupt the drying these mixers, it is also possible to interrupt the drying process at any time in order to put in further organic matter, without having to terminate the process sequence beforehand. This has the advantage that, for example, during daylight hours and in the evening of a day, meal residues, kitchen wastes and the like can be poured into the mixer after the vacuum process has been interrupted, and the final drying can be carried out during nighttime hours. In the morning, the mixer can then be emptied by the emptying opening, the organic, dried matter firstly being disintegrated by the progressive mixing process and secondly being dried by the continuous withdrawal of the air containing gas and moisture. This process is carried out virtually without any smell, it being possible for the condensate to be led directly into the sewer outflow. Here, emptying can be carried out into a holding container (mobile or stationary), into a container of a conveying system or a container of a waste system with which the dry matter can be put into sacks, which can then, for example, also be evacuated and then closed. Furthermore, the condensate can also flow away into a condensate collecting container which, for example, can be connected as desired to the sewerage network via a controlled valve device. This has the advantage that a discharge of the wastewater is carried out in pulsed fashion and the feed lines to the sewer are not continuously open. As a result, smell nuisance from the sewer is ruled out. As a result of the possibility of continuous loading and of the process sequence within one day, putrefaction bacteria cannot increase either and contribute to the specific smell nuisance.

Advantageous refinements of the mixer and the installation are specified in detail in the subclaims. Reference is made thereto.

One special configuration of the mixer is provided when two drives for two centrally mounted blade arrangements and a central impact knife arrangement are provided which, in the case of mixing, effect an opposite transport direction of the material to be mixed, so that the outer mixing blades always move the material to be mixed to one end of the mixing trough, while the inner mixing blades or the impact knife move the material to be mixed in the opposite direction within the outer mixing blades, so that, given simultaneous rotation, an intrinsically circular movement of the material to be mixed from one side to the other side in the mixing trough is effected. As a result, optimal mixing and liberation of water vapor is ensured, even during a short mixing period. The use of an impact knife to achieve this suction toward one side simultaneously has the effect that the material to be mixed is additionally disintegrated. In this case, the propeller-like knife equipment—just like the use of screw-shaped blades as a central blade arrangement—effect suction and pressure toward the end. However, the pressure is cancelled by the outer screw wipers, the latter conveying the material in the opposite direction. A mixing effect is therefore produced.

The mixing effect by means of a mixing blade arrangement according to the invention is also provided when both the inner mixing blade or the impact knife and the outer mixing blade rotate in one direction. However, the mixing intensity can be increased substantially and the mixing time can be reduced substantially if the inner and outer mixing blades rotate in opposite directions, so that the circulating flow effect described is achieved and, at the same time, ejected parts are also incorporated into this flow. Furthermore, it has been shown that an accelerated mixing effect is achieved if the mixing blades are switched on at intervals, the switching intervals of the inner and outer blades expediently being carried out with a time offset. Furthermore, at the same time as the switching intervals, it is recommended to change the direction of rotation of the driven outer or inner mixing blades as well, it also being possible for this change to be controlled individually, so that overlapping of the conveyance of material to be mixed by the outer mixing blades and inner mixing blades, on the one hand, and the opposite direction of rotation, on the other hand, can likewise be provided. An identical direction of rotation, that is to say an identical conveying direction, likewise accelerates the mixing effect. It has also proven to be advantageous to design the outer mixing blades to be relatively wide or else to provide them with combs reaching inward, in order to throw out the material to be mixed in larger quantities. If the mixing blades are hollow, heating elements or water distributors and collectors can be provided in these, in order to achieve a heating water circuit via a hollow shaft. Furthermore, it has been shown that an inner mixing blade is completely able to function even if, by way of example, it comprises only a circular arc segment which is intrinsically slightly rotated. Such an inner mixing blade can be used both as a single-arm spiral and as a double-arm spiral. In the case in which impact knives are used, a plurality of such impact knives can also be fixed to a shaft, which is arranged centrally within the outer mixing blade and is mounted on both sides. A flow direction can also be achieved by the impact knife arrangement. In addition, the impact knives can be arranged to be offset and running in the same direction but effecting different flow directions, or else driven in opposite directions on different shafts which are plugged into each other, in order to accelerate the disintegration and mixing effect. Here, the invention permits those skilled in the art to have diverse possible designs for optimization.

A mixer for an installation according to the invention can thus be used as an individual mixer in a conventional way. However, it can also be employed while using an impact knife arrangement, which can comprise a single knife or a plurality of knives lined up next to one another which, for example, are seated on a shaft distributed over the entire length of the mixing trough, as a disintegration mixer. Furthermore, by means of appropriate coordination of the drives of the outer blades and the inner blades, it is also possible to use the mixer as a controlled continuous mixer in a large installation. In the case of a design as a continuous mixer, it is necessary for part of the blade arrangement of the mixer to be present in a cylindrical part and to provide a particularly long conveying blade arrangement, in order to effect mixing within this cylindrical part as well, before the outer blades convey the mixed and dried or partly dried material to the next mixer via the outlet opening. Of course, a continuous mixer can also be set up in such a way that the charging with material to be mixed is carried out automatically with a normal design as soon as a mixing operation or a drying process has been completed and the mixer is emptied once more.

If the mixer is to be emptied, it is merely necessary to stop the drive of the inner blade arrangement or knife arrangement or to arrange for it to act in a transporting manner in the same direction, that is to say to control it so as to add to the conveying movement of the outer blades in such a way that quicker emptying via the emptying opening takes place. Furthermore, it is possible during the emptying process to arrange for the inner arrangement of the blades or the knives to rotate quickly in a pulsed manner, so that adhering material to be mixed is thrown outward and is picked up there by the wipers of the outer mixing blades. In the same way, toward the end of an emptying process, the rotational speed of the outer blades can be increased, so that material to be mixed adhering thereto also slides in an optimum way to the outer edges of the outer mixing blades. This has the advantage that virtually no material to be mixed is still in the mixer following emptying. Optimum self-cleaning is ensured. Furthermore, hygienic cleaning is possible in a straightforward manner if the blade arrangements can be withdrawn upward from the drive shafts via quick-action couplings.

For the purpose of stabilization and to increase the mechanical strength in the case of a paired arrangement or in the case of a uniform circumferential distribution of a plurality of blades, the ends of the mixing blades can be joined to one another at their ends. If the connection consists of a propeller-like cleaning blade fixed thereto and running transversely in the mixer housing, then the mixed and dried material is cleared out of the housing more quickly. In addition, the ends of the inner blades can be joined to one another. Instead of one of the paired blade arrangements, three or more blades can also be provided, which can also be equipped with heating systems.

By means of the horizontal arrangement of the mixing trough and the mixing blades, during mixing the material to be mixed is pushed forward from one side to the other side by the outer blades and sucked back and simultaneously also circulated by the inner mixing blades. During this process, material to be mixed that is transported upward by the mixing blades also falls into the interior, so that in addition to the flow, continuous mixing of material still adhering to the mixing blades is also provided. It has been shown that optimum mixing is also provided if the feed chamber above the mixing blades is open. In this case, the material to be mixed is not thrown outward either if the projecting housing walls are lengthened upward above the mixing trough. As a result, it is further possible to put in material to be mixed up to a height which is higher than the mixing blade diameter of the outer mixing blades. In terms of length and/or height, the mixing trough can be matched to desired mixer sizes, as can the mixing blades. For instance, mixer sizes from 100 l to 1000 l can be achieved in a straightforward way merely by lengthening or widening.

By means of the adjustable motors, the rotational speed of the mixing blades can be matched to the respective material to be mixed, for example coarse or fine. The fact that the housing can be displaced in the vertical direction with respect to the subframe means that any desired working height can be set. This is advantageous during manual loading or during automatic loading from another machine. The working height can be lowered to such an extent that automatic loading from relatively low processing machines is also possible or the material to be mixed can be put in by hand. In the raised position, it is possible to push a transport wagon in a straightforward manner under the side of the mixer on which the outlet of the emptying opening is provided. By means of an appropriate direction of rotation of the outer blades, because of the turning the material to be mixed is pushed out through the open emptying opening and falls into a conveying installation with conveyor belt and/or screw conveyor, into a transport wagon or into a sack, bag, carton or another container which can be closed and/or evacuated and/or welded.

The closure element for closing the emptying opening in a simple configuration can be a pivotable flap or a slide with a rubber seal, which is fixed to the outer side of an end wall such that it can be pivoted about an upper horizontal pivot axis. The emptying opening is located in the end. For the purpose of actuation, it is expedient to use a toggle lever mechanism which, as is known, comprises a first lever which has to be fixed to the flap so that it can be pivoted and is connected such that it can be pivoted to an actuating lever, which is mounted around a stationary rotary bearing in the housing. This lever is lengthened beyond the rotary bearing in order to be able to actuate the lever, which is connected to the first one mounted such that it can pivot. This embodiment has the advantage that, given appropriate dimensioning of the two levers connected to each other in an articulated manner, in a lower position a dead-center position can be assumed, which means that the joint can be moved below the connecting line between the two attachments to the housing, on the one hand, and to the flap, on the other hand, so that secure, airtight closure of the flap is possible without further aids.

The wiping lip to be provided on the outer blades can be screwed on in a simple way by means of a holder. However, such a wiping lip can also be pushed into a tubular holder provided on the outer edge. In this case, the lip projects out of a slot and, for example, is retained in the tubular opening. This has advantages in terms of fabrication and can be implemented easily. Furthermore, the wiping lip can have a rear profile which corresponds to the cross section of the tubular holder, so that sealed insertion is made possible which, in particular in the case of using organic matter, has the advantage that no residues of the organic matter can be deposited on the mixer blades and the sealing lip or in the transition region, and the latter can be removed simply by means of a steam jet.

BRIEF DESCRIPTION OF THE DRAWINGS

The invention will be additionally explained below by using the exemplary embodiments illustrated in the Figures.

In the Figures.

DETAILED DESCRIPTION

Figure 1:
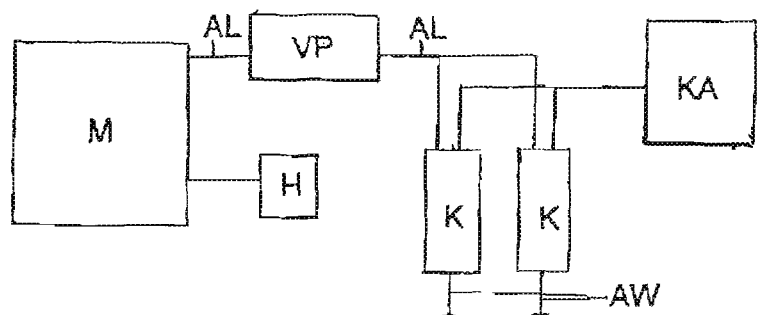
FIG. 1 shows an installation according to the invention in a schematic block representation.

FIG. 1 indicates an installation according to the invention schematically in the form of a block diagram. The mixer M is constructed as a vacuum mixer. It can be loaded at the top through a closable filling opening 42, for example, and, as described by using the further figures, is sealed off in an airtight manner by a hood and is connected to a waste air line AL, which is connected to a vacuum pump VP. The pump VP is connected to the mixer M by an extraction connector 40. Furthermore, a heating device H is also provided, with which the material to be mixed put in is heated, for example to about 80° C. By using the vacuum pump VP, a vacuum between 100 and 2 mbar, for example, is generated in the mixer housing. The extracted air is fed via the waste air line AL to the two condensers K, in which the vapor contained is condensed to form wastewater AW. This wastewater AW can then be fed directly to a sewer connection or collected in a condensate container and then fed to a wastewater sewer under control with the aid of valve technology. The condensers are commercially available condensers, which are connected to a cooling system KA, by which cooling liquid is produced, which flows around and cools the condensation pipe in the condenser K.

Figure 2:
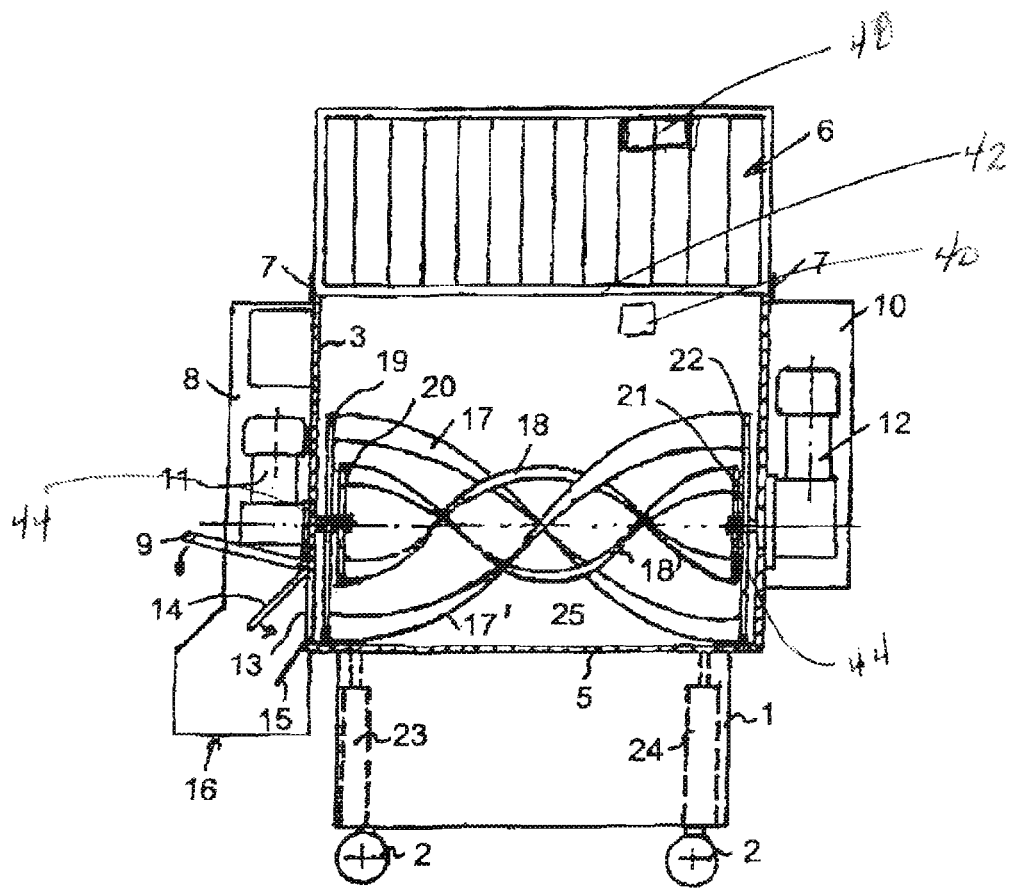
FIG. 2 shows a mixer having a mixing trough, shown in partial section, and attached outer and inner mixing blades having schematically illustrated drive devices.

A particularly suitable mixer is illustrated in FIG. 2. This has a subframe 1, which can be moved on the floor by means of wheels 2. A carrier plate for the other units can also be mounted thereon. With respect to the subframe 1, a fitted housing of the mixer is arranged so that it can be adjusted in the vertical direction. This makes it possible to move the mixer housing to various working heights with respect to the floor or to various height positions with respect to the subframe 1. This is brought about by lifting devices 23, 24 which are arranged in the subframe. These can be, for example, hydraulic cylinders or scissors lifting units or other lifting devices, driven by motor or by hand. In the illustration, for reasons of simplicity, the drawing of the heating channels and the feed line for the heating medium has been omitted. Likewise, no suction connections have been shown, which are connected via the waste air line to the vacuum pump, which is in turn connected to the condensers.

The supporting element of the mixer is the mixer trough 25, which is a constituent part of the housing and, in the lower region, has a semicircular base trough 5 and walls running upward rectilinearly or opening slightly conically. This makes it possible to put in material to be mixed beyond the diameter of the mixing blades comprising arms 17, 17'. The mixing trough is terminated at the front by an end wall 3 and at the back by an end wall 4 and is produced from stainless steel, for example. Introduced into the mixing trough are the outer mixing blades comprising arms 17, 17', which are circularly wound and which are rotatably mounted on the ends 3 and 4 in bearing and/or bearing journals 44, specifically in such a way that the mixing blades are guided along at a short distance above or resting on the half shell-like lower part 5, so that for example fitted wipers can slide along on the bottom wall. The mixing blades comprising arms 17, 17' are fixed on both sides to connecting rods respectively, in each case, to a flange 19, 22 which is mounted centrally. Connected centrally to the flange 19 is a shaft, for example a hollow shaft, which is driven by a controllable electric motor 11, for example via a gearbox, or is connected directly thereto. Via the hollow shaft, heating water can be let into the hollow blades from one side via a distributor and let out on the other side. The motor sets the outer blades comprising arms 17, 17', mounted in the mountings at the ends 3 and 4, rotating. The blades are helical, the pitch of the helices, the length and the total length of the blades depending on the holding capacity of the mixing trough. By means of the way in which the turns of the rotating helical blades are wound, for example in the case of clockwise rotation, the material to be mixed that is put in is transported from left to right in the mixing trough 25; in the opposite direction if the direction of rotation is reversed. In the process, the blades throw up the material to be mixed, so that material to be mixed and also carried upward, for example lumps of meat, can fall into the interior of the outer mixing blades comprising arms 17, 17'. Provided in the outer mixing blade arrangement arms 17, 17', which comprises two blades in this case, is a further, inner blade arrangement comprising mixing blades 18, 18' which, in the exemplary embodiment according to FIG. 2, likewise comprises continuous helical mixing blades 18, which are in each case intrinsically rotated twice, consist of flat material and have an oblique position. The central mixing blades or arms 18 and 18' are likewise connected to each other at their ends via holders or an annular flange 20, 21 or fixed to the latter. These retaining webs or annular flanges 20, 21 are rotatably mounted centrally and can contain heating water distributors or collectors, the left-hand ends of the blades being rotatably mounted by the annular flange 20 on the flange 19 or the annular flange provided there for the outer blades, or being rotatably mounted on the shaft which drives the outer mixing blades, while the mixing blades on the right-hand side are fixed to the supporting flange 21 on a shaft which is pushed through the supporting arrangement or the annular flange 21 and which transmits the rotational movement to the inner mixing blades. The shaft is a constituent part of the drive motor 12, which is fitted at the side. This motor should expediently also be a controllable motor. The controlled motor 12 is accommodated in a housing 10, which is fixed laterally to the end wall 4.

Depending on the material to be mixed, it is recommended to set the rotational speeds of the outer mixing blades between about 5 and 40 rev/min and that of the inner blades between about 10 and 80 rev/min. The inner mixing blades or arms 18 and 18' should rotate more quickly than the outer mixing blades, specifically in the opposite direction to the latter, so that the material to be mixed, when transported from the left to the right by the outer mixing blades, is transported from right to left by the inner blades or in the opposite direction in the event of the rotation being reversed. As a result, a longitudinal flow and backflow of the material to be mixed is ensured with the simultaneous discharge of moisture. If, then, mixed, dried material is to be emptied from the mixing drum, then it is merely necessary to arrange for the inner mixing blades no longer to rotate in the opposite direction but for both mixing blades to be set rotating in the same direction of rotation, so that the material to be mixed emerges slowly from the emptying opening 13. The emptying opening 13 is closed by the flap 14, which is arranged on a bearing on the end wall 3 within the covering housing 8 such that it can pivot and can be actuated via a lever 9. For the purpose of closure, the lever 9 is pressed downward in the direction of the arrow shown, by which means the opening 13 is closed. In order to open it, the lever 9 is moved upward, so that the pivoted position illustrated is assumed and the material to be mixed is transported out by means of counterclockwise rotation of the outer mixing blades 17 and 17'. A deflection plate 15 ensures that the material to be mixed can fall through the opening duct 16 of the housing 8. It can be seen that, in the design illustrated, virtually only a flat container or a bowl can be pushed under the opening duct 16. If, then, the mixing trough 25 is raised by the lifting devices 23 and 24, then a larger transport wagon, such as is common in butchers' shops and large kitchens, can be moved underneath in order to be able to accommodate all of the contents of the mixing trough 25. After emptying, the housing can be moved down again, in order to ensure easier loading into the top opening.

The housing has an upper pivot bearing 7, which is used to hold a vacuum hood 6 such that it can rotate. This vacuum hood 6 can have, for example, a vacuum indicator 48, likewise the connecting piece for the waste air line. It is also possible for a viewing window to be provided, in order to permit a view into the mixing drum during the mixing and drying process. A protective grill can also be interposed, through which the material to be mixed can be put in. This can also be designed to be folded up at the same time. For the purpose of loading, the vacuum hood 6 can be folded up and the material put in. Furthermore, the vacuum hood 6 offers the possibility that, with the closure or opening, electric switching devices can be controlled, which permit the motors to start only when the vacuum hood 6 is in the closed position, so that access into the rotating mixing blades is not possible. In addition, the activation of the vacuum pump and of the heating device and, if appropriate, also the cooling unit can be coupled with the control device. Furthermore, a microwave generator can also be arranged in the vacuum hood as an additional or sole heating device. The latter can also be arranged to be integrated into the side walls. It has been shown that, when the microwave generator generates microwaves in the region of 2.5 GHz, rapid heating of the material to be mixed, primarily including internal heating, is optimally possible even when the mixing blades or shafts consist of metal.

Instead of or else in addition to such heating devices, it is also possible to use an infrared radiation source, which can be integrated into the vacuum hood 6 or positioned at a different point on the housing. It has proven to be particularly advantageous to generate infrared light waves in the range from 2 to 6 μm in order to achieve good introduction of heat into the material to be mixed.

Figure 3:
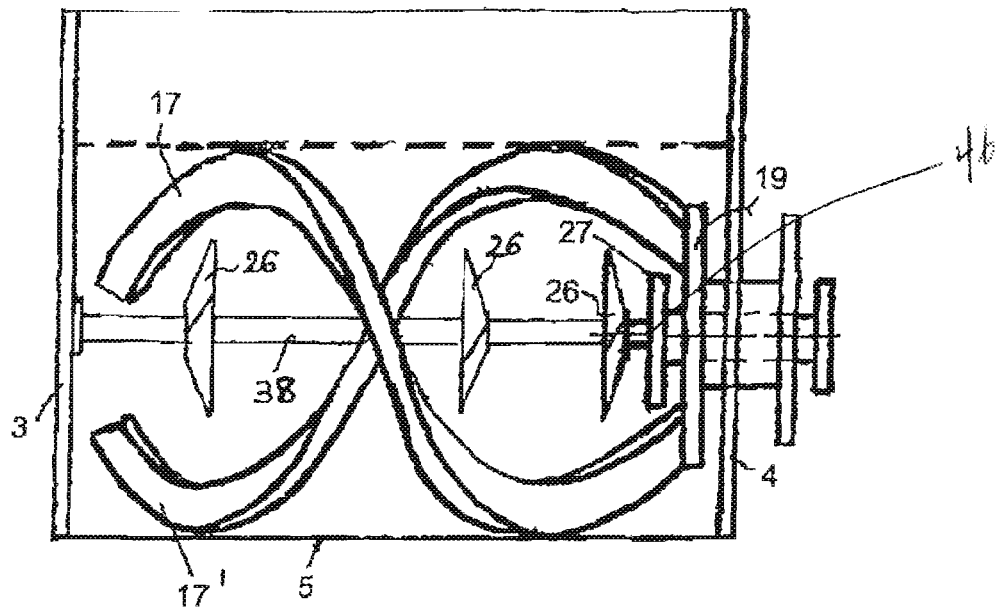
FIG. 3 shows a schematic illustration of a variant of the mixing blade arrangement using an impact knife.

FIG. 3 illustrates, schematically, a variant in which a motor or a motor coupling is provided on one side of the housing. The other parts of the housing and the subframe are not illustrated here. The outer blades 17 and 17' act in the same way as those according to FIG. 2. In this case, the inner blade comprises an impact knife, which rotates substantially more quickly but is nevertheless able to suck in the material in the same way as the inner mixing blades 18, 18' according to FIG. 2 but with a reduced effect as regards drawing in the materials at the outer end of the blades 17, 17' which, in the example explained, are not joined to one another, which is not necessary either given a short design of the mixing trough and, in particular, is not necessary either when, as shown dashed, the blades are rotatably mounted in a housing which has a cylindrical shape and which, for example, has an opening for loading. For the purpose of emptying, the drive of the impact knife 26 in the mounting region 46 is stopped in this design as well, while the rotation of the outer blades 17, 17' is maintained and possibly reduced, so that material to be mixed can run out of the outlet opening 13 likewise provided. To change the impact knife 26 quickly, it is moreover possible for an interchangeable holder 27 to be provided, so that other knife arrangements or blade arrangements can be plugged on as needed. In the same way, such an interchangeable device can be used in order to be able to perform a quick change of the blade arrangements. The nested central mountings for the rotary drive of the outer blades 17 and 17' and of the impact knife 26 are likewise illustrated schematically. The exemplary embodiment in FIG. 3 further shows that the shaft 38 for the impact knife 26 can be arranged to be continuous. Various impact knives 26 are arranged on the shaft. The left-hand impact knife is shown as oriented in the opposite direction, which is intended to symbolize the fact that the knives can be arranged not only to act in one flow direction but also oppositely, in order to achieve a vortex flow, for example, with simultaneous disintegration.

Figure 4:
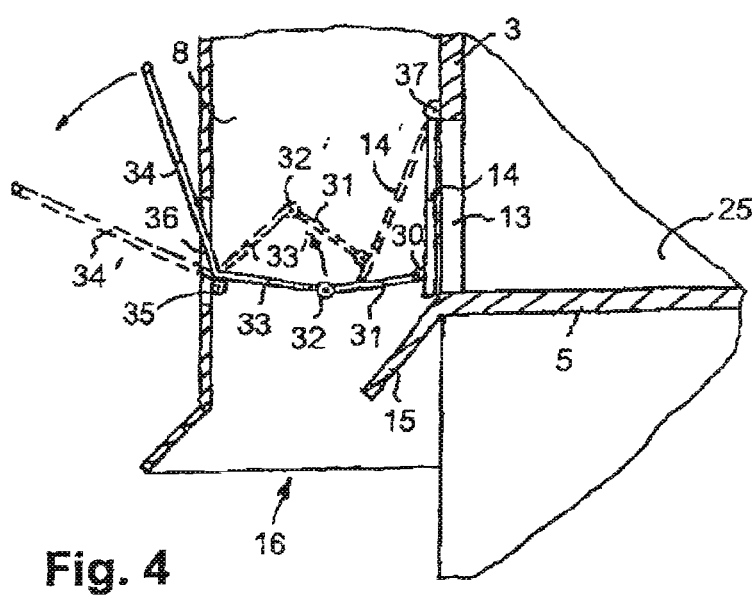
FIG. 4 shows a closing device for a flap of an emptying opening of the mixer

In FIG. 4, the region of the mixer according to FIG. 2 in which the emptying opening 13 is provided in the end wall 3 of the mixing trough 25 is illustrated in partial section as a detail. Furthermore, it can be seen from the figure that the deflection plate 15 is provided in the extension of the bottom 5 of the mixing trough 25. In front of the emptying opening 13, the flap 14 is drawn in the closed position. This flap is mounted such that it can pivot about an upper pivot bearing 37, which runs horizontally, and can be pivoted to the left. Differing from the exemplary embodiment according to FIG. 2, the flap 14 is actuated via a toggle lever closure. This toggle lever closure comprises a first lever 31, which is fixed to the flap 14 via a pivot bearing 30 such that it can pivot and, at its other end, is attached to a lever arm 33 via a bearing 32 such that it can rotate, said lever arm 33 being a constituent part of an angled actuating rod 34, which is attached around a pivot bearing 35 in the angular region on the inner side of the outer wall of the front extension housing 8. The actuating rod or the actuating handle, if the latter is bow-like and has two rods, reaches through mounting slots 36 in the outer wall. The lengths of the lever 31 and of the lever arm 33 are matched to each other such that, in the position illustrated, they are located with their connecting bearing 32 underneath the connecting line between the pivot axes 30 and 35 or on the same connecting line, so that, by means of the extended arrangement or the obtuse-angled arrangement illustrated, an automatic closure safeguard for the flap 14 is provided. If the flap 14 is pivoted to the left into the position 14' illustrated in order to open the emptying opening 13, then it is necessary for a force to be exerted on the actuating lever 34 or the handle 34 in the direction of the arrow shown, as a result of which the lever assumes the position identified by 34'. In the process, the fixedly angled lever arm 33 moves into the position 33' and pulls the lever arm 31 with it via the bearing 32', so that the flap 14 also assumes the position 14' automatically. In this position, the mixer can be emptied by means of appropriate control of the outer mixing blades, not illustrated. In the process, the material to be mixed is pushed out of the mixing trough 25 through the opening 13 and falls over the deflection plate 15 and the opening duct 16 of the housing 8 into a mobile material or transport wagon that can be moved underneath. Instead of the flap 14 illustrated here, it is of course also possible for a slide to be provided to close the opening 13, which slide then has to be operated by an appropriate mechanism. Furthermore, a pivoting slide, which is moved via a rotary mechanism and which exposes the opening 13, can also be provided, for example in the case of a round design. Furthermore, instead of the mobile transport or material wagon specified, a collecting container of a filling system or packaging system can also be brought into position under the emptying opening. It is also possible to put the emptied material directly into sacks that can be closed in an airtight manner, which are then, for example, evacuated and welded. Here, too, various possible ways of packaging the dried matter and/or transporting it onward and processing it are opened up to those skilled in the art.

An installation according to the invention can be designed to be controlled completely automatically electronically in such a way that the heating process, the vacuum pump and the condensate outlet can firstly be regulated and secondly also be controlled in such a way that, for example, when the vacuum hood is opened, the processes are interrupted and then continued again following closure, or the processing processes are terminated during the emptying process.

The invention claimed is:

1. An installation for drying organic matter comprising:
   (a) a vacuum mixer having at least one mixing blade in a housing and having a closable filling opening for introducing organic matter and a closable emptying opening on the underside or laterally toward the underside for the dried matter,
   (b) at least one vacuum pump, connected to at least one extraction connector fitted in the housing of the mixer above a maximum filling height, in order to extract the air in the mixer to produce the vacuum,
   (c) a heating device for heating the organic matter,
   (d) at least one condenser, connected to the waste air line of the vacuum pump, and having a cooling unit connected thereto for condensing the extracted air, and
   (e) a drain line for the condensate obtained from the waste air by cooling in the condenser, wherein the mixer has an elongated housing which, in the event of horizontal arrangement of its longitudinal axis, is formed in its lower region as a trough shaped like a circular segment and, at its two ends, in each case has an end wall and side walls extending upward, which at the top delimit the filling opening, which can be closed off in an airtight manner by a cover or a hood, wherein at least one emptying opening is provided in the housing in the lower region of the trough, wherein at least one outer and at least one inner mixing blade are arranged in the housing, are mounted on a common axis on at least one end wall and can be driven separately or in a coupled fashion, the outer mixing blade conveying the material to be mixed in a specific longitudinal direction of the housing, and the inner mixing blade conveying the material to be mixed in the same or opposite longitudinal direction as the outer mixing blade, and wherein the outer mixing blade is at least partly hollow, and in that the heating device is inserted into the hollow or a heat exchange medium can be led into and out of the hollow via a lateral distributor having a central pipe connection, the inner mixing blade being continuous or being replaced by at least one rotating impact knife, the impact knives being fixed to a shaft.

2. The installation as claimed in claim 1, wherein the at least one mixing blade is formed with one arm, two arms or multiple arms and in the shape of a helix having a partial turn or a complete turn or a plurality of turns, and rotates, wiping along at least the bottom of the mixing trough shaped like a circular segment.

3. The installation as claimed in claim 1, wherein the inner mixing blade is a mixing blade having one arm, two arms or multiple arms and being helical or screw-like.

4. The installation as claimed in claim 1, wherein a helix is a partial turn, a complete turn or a multiple turn.

5. The installation as claimed in claim 1, wherein the inner mixing blade or the at least one impact knife are provided in the mounting region in front of a flange in the interior of the mixing trough on one or both sides and run only over a partial section within the outer mixing blade.

6. The installation as claimed in claim 1, wherein the ends of the outer mixing blades are joined to each other via a transverse part or an annular disk, on which bearing journals or bearings for the mounting in the ends are provided centrally.

7. The installation as claimed in claim 6, wherein the transverse part or the annular disk is hollow and is joined to the heating device via a central connection on a hot water feed line or hot water drain line.

8. The installation as claimed in claim 1, wherein an inner mixing blade extending substantially over the entire length is provided centrally, and in that the ends of the mixing blades are fixed to a rotating flange, on which mixing blades a drive acts, at least on one side, or in that the inner mixing blade comprises impact knives which are fixed to a shaft and which are arranged in such a way that, during the simultaneous action on the matter put in, the latter is transported in a specific direction or, intermittently, in opposite directions.

9. The installation as claimed in claim 1, wherein the mixer blade arrangements are arranged in a half-shell mixing trough, and in that the second fitted half shell is formed by a cover.

10. The installation as claimed in claim 1, wherein the heating device is provided in one of the following locations: (1) in the bottom, (2) in a side wall of the housing of the mixer, (3) in the cover, (4) in the hood, and (5) at least in one mixing blade.

11. The installation as claimed in claim 1, wherein in the cover the heating device is a microwave heating device.

12. The installation as claimed in claim 1, wherein in the cover the heating device contains a heat source emitting infrared radiation.

13. The installation as claimed in claim 1, wherein in the cover a vacuum indicating measuring instrument is fixed to the hood.

14. The installation as claimed in claim 1, wherein in the hood a switch for switching off the vacuum pump and a valve for the input of air are provided on the mixer, and a control device is provided which permits the actuation of the valve only when the vacuum pump is switched off.

15. The installation as claimed in claim 1, wherein in the hood an interlock circuit is provided, which regulates or blocks the control of the vacuum pump, condensate outlet, heating device as long as the emptying opening is open.

16. The installation as claimed in claim 1, wherein in the hood the vacuum pump and the cooling unit for the condenser are switched on and off in parallel.

* * * * *